Figure 1:
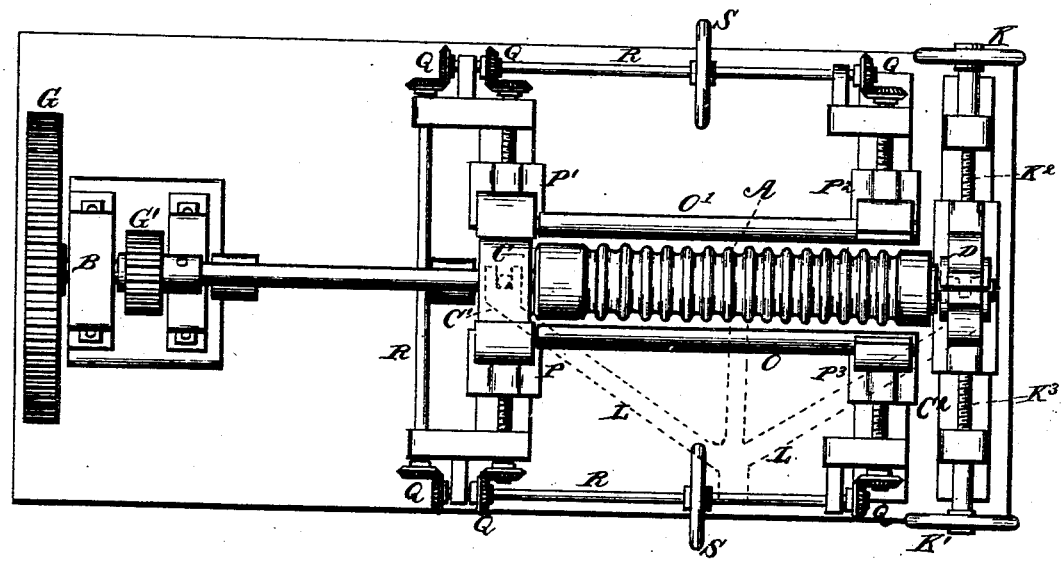

3 Sheets—Sheet 1.

S. FOX.
Machinery for Corrugating Metallic Tubes.

No. 225,586. Patented Mar. 16, 1880.

WITNESSES
Robert Everett
H. Clay Smith

INVENTOR
Samson Fox.
By Thomas D. Stetson
ATTORNEY

S. FOX.
Machinery for Corrugating Metallic Tubes.
No. 225,586. Patented Mar. 16, 1880.
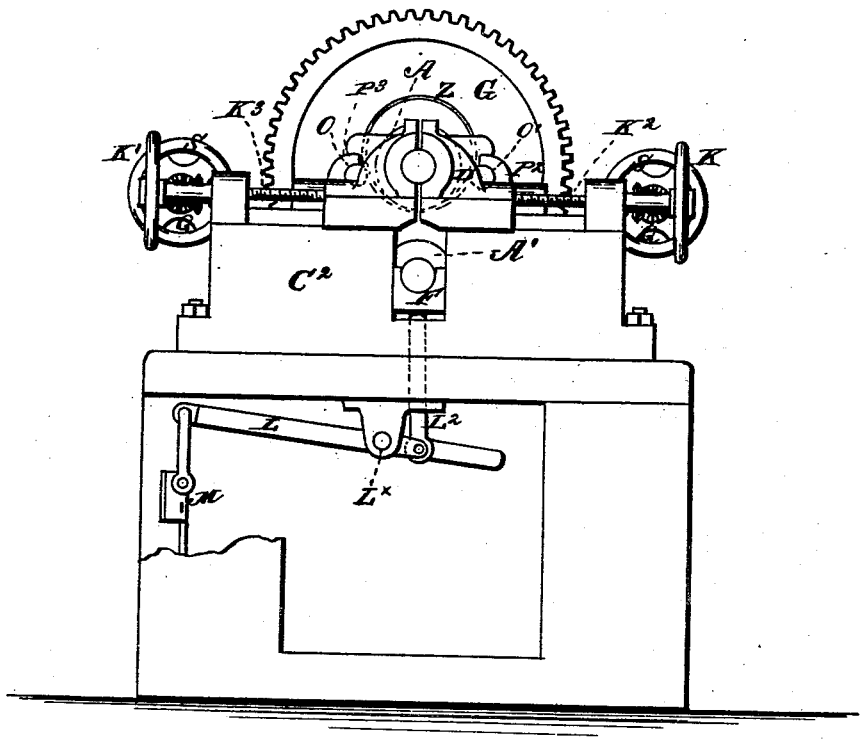
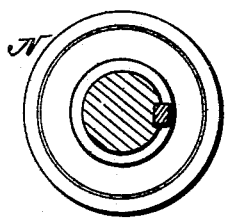
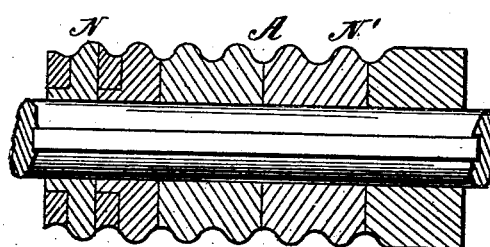
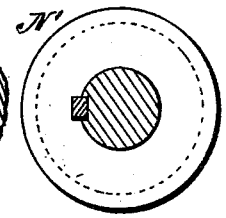
WITNESSES
INVENTOR
Samson Fox.
by Thomas D. Stetson
ATTORNEY S. FOX.
Machinery for Corrugating Metallic Tubes.
No. 225,586. Patented Mar. 16, 1880.
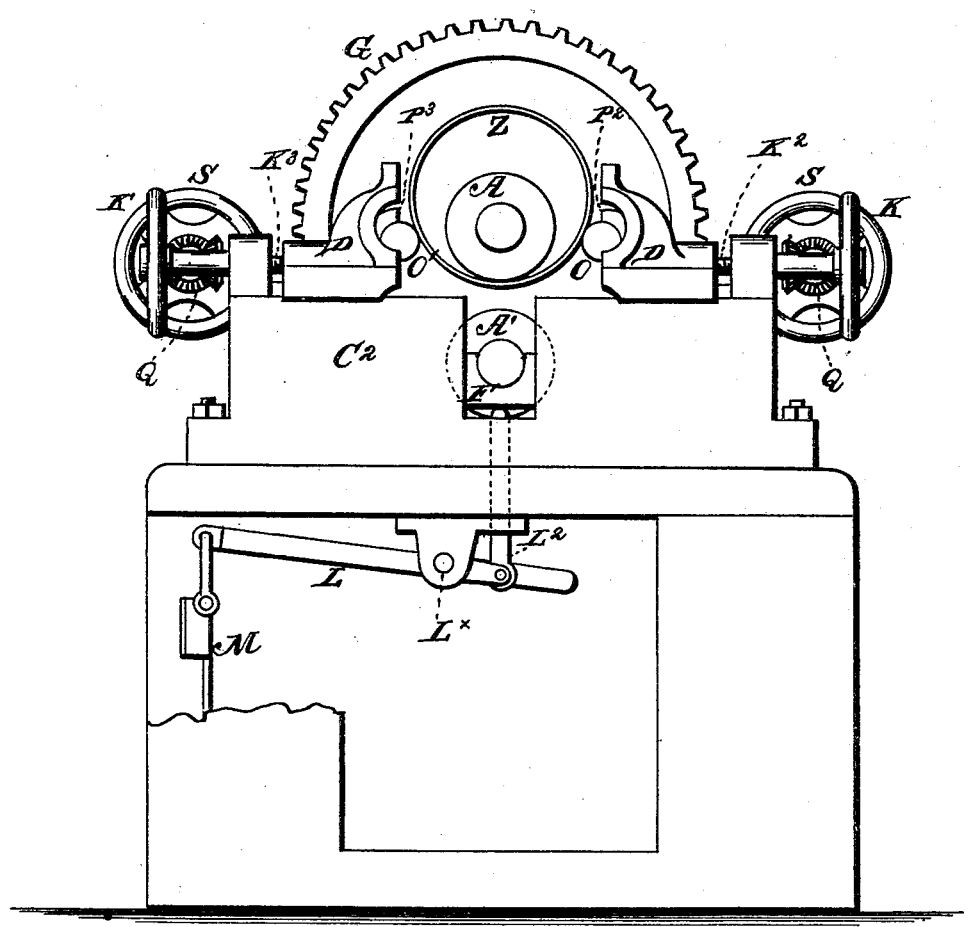

UNITED STATES PATENT OFFICE.

SAMSON FOX, OF LEEDS, GREAT BRITAIN.

MACHINERY FOR CORRUGATING METALLIC TUBES.

SPECIFICATION forming part of Letters Patent No. 225,586, dated March 16, 1880.

Application filed March 1, 1878. Patented in England, December 29, 1877.

*To all whom it may concern:*

Be it known that I, SAMSON FOX, of The Leeds Forge Company, Leeds, Yorkshire, England, have invented certain new and useful Improvements in Machinery or Apparatus for the Manufacture of Corrugated Tubes and Plates, which improvements are fully set forth in the annexed specification.

The accompanying drawings form a part of such specification, and represent what I consider the best means of carrying out the invention.

The tubes and plates in question are formed with corrugations or undulations which, in the case of the tubes, represent annular ridges and grooves.

In the manufacture of the tubes I first form, in the ordinary way, plain cylindrical tubes, which I weld at the joints, and I then form the corrugations or annular ridges and grooves by rolling, as hereinafter described.

For rolling such tubes to the desired form I use an improved system of rolls wherein the two main rolls (which are suitably driven) both have corrugating annular grooves and projections formed on their peripheries, and are so relatively arranged that the projections of the one roll take into or are opposite to the grooves of the other roll; and in order that the tubes to be operated upon may be readily got into position over the one roll which has to operate upon the inner surface of the tubes, that roll is provided with three or more bearings, one of which bearings, at the one end of said roll, is made capable of being moved away from the roll. By this arrangement, when a tube is to be placed in position for being operated upon the said bearing is removed, so as to leave that end of the roll free, the roll being meantime supported by the other bearings in its usual position. The tube to be treated is then placed on the said roll, loosely inclosing it. Thus conditioned, one portion of the tube is situate between the two rolls, in a position to be operated upon when the machine is started, the inner surface by the roll in its interior and the outer surface by the other roll. The tube having been thus passed over the free end of the roll and placed in position for treatment, the bearing at that end is rapidly replaced, and the rolling operation may be commenced.

One of the rolls is movable up and down bodily, and is provided with a system of levers arranged to be operated by steam, hydraulic, or other power for bringing the rolls closer together, and thus smoothly and completely initiating and perfecting the corrugations as the tube is rolled many times around, passing each part in succession through the compression to which it is subjected between the inner and the outer roll.

In order better to support the tube while undergoing the corrugating operation, and that it may assume and retain a comparatively true circular form, a second or additional pair of rolls is arranged in combination with the main rolls above described.

I now proceed to describe a rolling-machine embodying my improvements.

Figure 2:
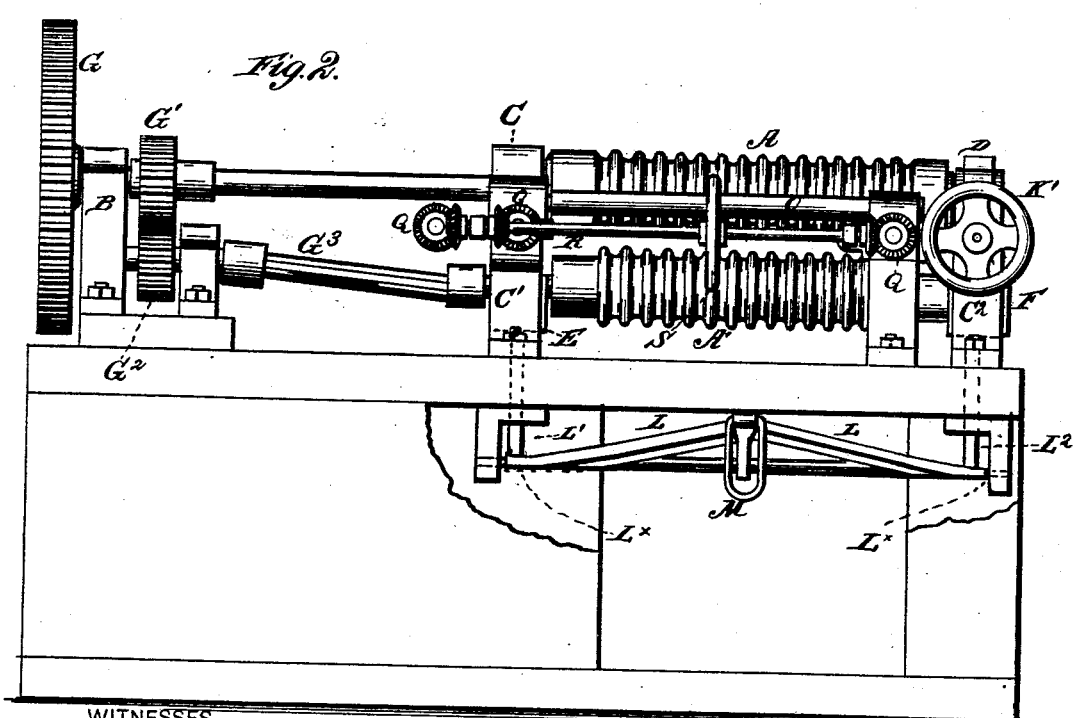

Of this rolling-machine, Figure 1 of the drawings is a plan, Fig. 2 a side elevation, and Fig. 3 an end elevation with the bearing D closed. Fig. 4 is a detached longitudinal section of one of the rolls, (both being alike.) Figs. 5 and 6 are cross-sections thereof. Fig. 7 is an end elevation, showing the bearing open.

The top roll, A, with its axle prolonged on one side, is suitably mounted in the bearings B C D, and is capable of revolving freely therein.

The bottom roll, A', is also suitably mounted in the bearings E and F, revolving freely in the same, the said bearings having a vertical movement in the housings C' and C².

Both the top roll, A, and the bottom roll, A', have corrugating annular grooves and projections formed on their peripheries, which are so relatively arranged that the projections of the one roll take into or are opposite to the grooves of the other. One or both of the said rolls is or are suitably driven from the motive power by the gearing G, G', and G², and the connecting-spindle G³. It will generally be necessary to drive both rolls; but if at any time it be required to drive only one roll the said connecting-spindle G³ must be removed.

In order that the tubes to be operated upon may be readily got into position over the one roll, A, which has to operate upon the inner surface of the tubes, the end bearing, D, of that roll is constructed in parts, as shown, which parts are capable of being moved away from the axis of the said roll A by means of the hand-wheels K K' and screws K² and K³.

By this arrangement, when a tube is to be placed in position to be operated upon the said bearing D D is moved back, as shown in the end elevation, Fig. 3, so as to leave the one end of the said roll A free, the roll being meanwhile retained in its normal or horizontal position by the other bearings B and C, or it may be by one long bearing in lieu of B and C, the pinions G' G² being arranged at the outer end between the bearing and wheel G. The tube to be operated upon, Z, is placed, while at a good red heat, such as is usual for flanging, on the said roll A, which it surrounds, a portion of the tube being, throughout its length, situated between the two rolls A and A', so that it will be in a position to be operated upon, when the machine is started, on its inner surface by the said roll A, and on its outer surface by the said roll A'. The tube having been passed over the free end of the said roll A, the bearing D D is then closed, so as to properly support the roll, the rolls are caused to revolve, and the rolling operation may be commenced. To this end the roll A', with its previously-described vertical movement, is now, for operating upon the tube, brought gently into contact therewith by means of a system of levers, L L, having their fulcra at L*, and links L' and L², (whose upper ends enter recesses in the bearings E and F, respectively,) so arranged as to be actuated by steam, hydraulic, or other power, in connection with the part M.

The said rolls A and A' may each be made in one piece; but, by preference, they are compound rolls—that is, made in sections or rings of chilled cold-blast iron, either as shown at N, Figs. 4, 5, or as shown at N', Figs. 4, 6. The whole of the said sections or rings, composing each roll, are fixed on a common axle, as shown.

In order to better support and guide the tubes while undergoing the corrugating operation, and that they may assume and retain a comparatively true circular form, a second or additional pair of rolls, O O', which may be formed with grooves and projections alternating, so as not to injure the corrugations formed in the tubes by the main corrugating-rolls A A', are arranged in combination with the said rolls A and A'. One of these said additional rolls O O' is arranged on each side of, but above, the bite of the main rolls A and A', (see Figs. 3 and 7,) and the said additional rolls O O' are mounted on slides P, P', P², and P³, and are capable of being caused, by the gearing Q Q Q Q Q Q and its connecting-shafts R R R and hand-wheels S S, to approach or recede from the rolls A and A' simultaneously, as may be required. The rolls O O' are moved simultaneously up to the tube after the rolls A A' have made about two or three revolutions, and as the corrugating proceeds the main roll A' is to be gradually pressed farther toward the main roll A, and the rolls O O' are to be kept up against the surface of the tube.

The plain tube to be corrugated must be made slightly longer than its intended length after corrugation, because the two free ends of the tube will be drawn in slightly in the formation of the last two or outside grooves—say about five-eighths of an inch at each end when the depth of corrugation is two inches, and the distance from center to center of the grooves is six inches; but these dimensions will vary with circumstances.

The general arrangement of the above rolls may be such that their axes are in a vertical or an angular position, as may be most convenient. I prefer the horizontal arrangement.

When the arrangement is not horizontal (or approximately so) it will be necessary to put a slight flange on the end of the tube before placing it in the machine to be corrugated, and to provide suitable means, such as a groove in the roll A', to receive the said flange and support the tube endwise while being corrugated.

From the description hereinabove contained it will be evident that the object of my invention is, by the use of suitable rolls, to corrugate tubes by drawing the corrugations out of the sectional thickness of the metal composing such tubes, and that inasmuch as after withdrawal from the furnace the highly-heated tube presents to the cooling action of the surrounding atmosphere a surface of great extent in proportion to its thickness, it is essential, in order to get it properly corrugated and truly circular, that the entire operation should be rapidly performed.

Such being the object of my invention, it will be obvious the arrangement of rolling apparatus shown in the drawings may be modified in detail so long as the following essential features be retained—that is to say: According to my invention, the one main or corrugating roll, A, must be efficiently supported during the corrugating process, but so that its one end may be readily set free to enable a tube to be quickly placed upon that roll. The same roll must be kept *in situ* during the temporary withdrawal of its end support. The movable end support must be arranged to be rapidly returned into position to support the end of the roll on which the tube has been placed. The other main or corrugating roll, A', must be capable of being readily moved toward and from the stationary revolving roll A, as required, and, in conjunction with the main rolls, additional rolls must be used to aid in supporting the tube while under operation.

It is to be remarked that the main rolls are kept revolving at a surface speed of, say, about one hundred and fifty feet per minute, until the tube under operation assumes a black heat and is sufficiently set to permit of removal without distortion.

My improved apparatus may be used for corrugating plates before they are formed into tubes, such as boiler-shells. For corrugating plates, however, the movable end bearing is not essential, and, in lieu of the two supporting or guiding rolls O' O', arranged above the bite of the main rolls, I may use only one such roll, arranged somewhat lower relatively to the main rolls than is shown in the drawings. If the plate, when corrugated, is to be formed into a tube or otherwise joined at its edges, I do not carry the corrugations quite to the edges; but at each pass of the plate between the rolls I arrest and reverse the rolls just before the edge of the plate arrives between them, thus leaving a plain edge for the purpose of making any required joint.

I would remark that, in practice, when making iron plates to be corrugated, whether such plates have been intended to be first made into tubes or not, I have, for making such plates, used fagoted bars of refined best Yorkshire iron. It is necessary that the metal employed should have fiber in the direction of the width and length of the plate, or of the circumference and length of the tube, as the case may be, because there is very considerable draw upon the metal in those directions during the corrugating process. Some metal—for example, copper—may be corrugated cold.

What I claim is—

1. The combination, in a machine for corrugating metallic tubes, of a corrugating-roll having concentric annular projections and grooves, stationary bearings, and a bearing adapted to be removed to leave one end of the said roll free, a second corrugating-roll with similar projections and grooves, its projections being opposite the grooves of the first-named roll, means for causing the second corrugating-roll to approach the first-named roll, supplementary rolls for supporting and guiding the tubes while under operation, and mechanism for adjusting the position of said supplementary rolls nearer to or farther from the main rolls, all substantially as described.

2. The combination of the roll A, the bearings B C, the end bearing, constructed in parts D D, arranged to be moved away from the axis of the roll, and the hand-wheels K K', and screws $K^2$ $K^3$, for operating the said parts D, so as to leave one end of the said roll free, to enable the tube to be corrugated to be slipped onto the roll A, as hereinbefore described, for the purpose specified.

3. In combination with the main rolls A A' and means for adjusting and operating them, as described, the additional rolls O O', one on each side of the bite of the main rolls A A', the slides P P' $P^2$ $P^3$, gearing Q, connecting-shafts R, and other parts, constructed, arranged, and operating as described, for causing the side rolls, O O', to approach or recede from the main rolls A A' by turning the hand-wheels S, as described, for the purpose specified.

4. The combination, in a corrugating-machine, of the parts A, A', B, C, C', $C^2$, D, E, F, G, G', $G^2$, $G^3$, K, K', $K^2$, $K^3$, L, L*, L', $L^2$, M, O, O', P, P', $P^2$, $P^3$, Q, R, and S, all constructed, arranged, and operating as shown in and described with reference to Figs. 1, 2, 3, 4, 5, 6, and 7, inclusive, of the accompanying drawings.

SAMSON FOX.

Witnesses:
THOS. E. CRAVEN, *Leeds.*
R. E. P. CRAVEN, *Leeds.*